(12) United States Patent
Lee

(10) Patent No.: US 7,451,463 B2
(45) Date of Patent: Nov. 11, 2008

(54) DISC HOLDING APPARATUS AND DISC TRAY HAVING THE SAME

(75) Inventor: Tae-seok Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 358 days.

(21) Appl. No.: 10/959,139

(22) Filed: Oct. 7, 2004

(65) Prior Publication Data
US 2005/0193398 A1      Sep. 1, 2005

(30) Foreign Application Priority Data
Feb. 27, 2004   (KR)  .................... 10-2004-0013573

(51) Int. Cl.
G11B 17/03     (2006.01)
G11B 17/04     (2006.01)
G11B 33/02     (2006.01)

(52) U.S. Cl. .................. 720/603; 720/604; 720/617

(58) Field of Classification Search ............... 720/601, 720/603, 604, 615
See application file for complete search history.

(56) References Cited

U.S. PATENT DOCUMENTS 5,793,729 A * 8/1998 Soga et al. ................. 720/603
6,473,382 B1 * 10/2002 Tagawa et al. .............. 720/616
6,618,340 B1 * 9/2003 Sawada ...................... 720/603
2002/0044521 A1 * 4/2002 Sogawa et al. .............. 369/270
2002/0114254 A1 * 8/2002 Ohgaki ...................... 369/75.2
2004/0205784 A1 * 10/2004 Naoki ........................ 720/601

FOREIGN PATENT DOCUMENTS

| EP | 1 079 384 | 2/2001 |
|----|-----------|--------|
| JP | 02-014459 | 1/1990 |
| JP | 08-045157 | 2/1996 |
| JP | 9-212969 | 8/1997 |
| JP | 10-199088 | 7/1998 |
| JP | 2002-343004 | 11/2002 |
| KR | 89-9486 | 5/1989 |
| KR | 01-3302 | 2/1991 |
| KR | 1998-0009489 | 4/1998 |

* cited by examiner

*Primary Examiner*—Andrea Wellington
*Assistant Examiner*—Adam B Dravininkas
(74) *Attorney, Agent, or Firm*—Staas & Halsey LLP

(57) ABSTRACT

A disc tray including: a tray frame having a plurality of accommodation portions each of which selectively accommodates one of a plurality of discs having different diameters and at least one guide portion; and at least one holding apparatus coupled to the guide portion and which holds a selectively accommodated disc.

22 Claims, 4 Drawing Sheets

DISC HOLDING APPARATUS AND DISC TRAY HAVING THE SAME

CROSS-REFERENCE TO RELATED APPLICATION

This application claims the priority of Korean Patent Application No. 2004-13573, filed on Feb. 27, 2004, in the Korean Intellectual Property Office, the disclosure of which is incorporated herein by reference.

BACKGROUND OF THE INVENTION

1. Field of the Invention

The present invention relates to an apparatus for recording or reproducing information on or from a disc, and more particularly, to an apparatus capable of selectively loading a 120 mm disc and a 80 mm disc and a disc tray having the same.

2. Description of Related Art

In general, disc drives record information on a disc that is a recording medium by radiating light thereon and reproduce information from the disc. To this end, the disc drive includes a disc tray for accommodating a disc and a housing for slidably supporting the disc tray. Recently, for notebook personal computers, the disc drive itself is manufactured to be slim to reduce an installation space of the notebook to meet needs for compact and slim notebook personal computers. Also, the disc drive may be vertically installed to efficiently use a space.

FIG. 1 is a plan view of a conventional disc tray in which a 120 mm disc and a 80 mm disc can be selectively accommodated. FIG. 2 is a sectional view taken along line I-I' in the conventional disc tray of FIG. 1.

As shown in FIGS. 1 and 2, a conventional disc tray 10 includes a disc accommodation portion formed on an upper surface thereof to accommodate a disc D. The disc accommodation portion includes respective first and second disc accommodation surfaces 14 and 16 having different diameters to accommodate the disk D having different sizes. The first and second disc accommodation surfaces 14 and 16 are formed with a specified step.

For example, a disc having a relatively larger diameter is placed on the first disc accommodation surface 14 while a disc having a relatively smaller diameter is placed on the second disc accommodation surface 16. Typically, the disc placed on the first disc accommodation surface 14 has a diameter of 120 mm while the disc placed on the second disc accommodation surface 16 has a diameter of 80 mm.

Also, when the disc drive is installed vertically, a plurality of guide ribs 15a-15d are formed on the disc tray 10 at positions corresponding to an outer circumference of the disc D to prevent an escape of the disc D. The guide ribs 15a-15d are formed along the circumference of the first disc accommodation surface 14.

An external rib 18 having a specified thickness is formed at a leading end of the disc tray 10 and a step portion is formed at a trailing end thereof. The external rib 18 is separated by a specified distance from the first disc accommodation surface 14 at the opposite side to the step portion.

The disc tray 10 having the above structure moves with the disc D accommodated on a disk accommodation portion. When the loading of the disc D is completed, the disc D is placed on a turntable (not shown). Here, the disc D is separated a specified distance upward from the surface of the disc accommodation portion.

In this state, the disc D is rotated by a spindle motor (not shown). An optical pickup (not shown) radiates a light beam onto a surface of the disc D to record or reproduce signals on or from the disc D.

When the disc drive is installed vertically, if a 120 mm disc is placed on the first disc accommodation surface 14, the disc D is guided by the guide ribs 15a-15d so as not to escape from the disc accommodation portion of the disc tray 10. However, when a 80 mm disc is placed on the second disc accommodation surface 16, the disc D falls off from the second disc accommodation surface 16 during transfer of the disc tray 10.

BRIEF SUMMARY

To solve the above and/or other problems, an embodiment of the present invention provides a apparatus for holding a disc which can stably hold a variety of discs regardless of the installation state of a disc drive, and a disc tray having the apparatus.

According to an aspect of the present invention, there is provided a disc tray including: a tray frame having a plurality of accommodation portions each of which selectively accommodates one of a plurality of discs having different diameters and at least one guide portion; and at least one holding apparatus coupled to the guide portion and which holds a selectively accommodated disc.

The escape prevention portion and the escape prevention protrusion may be formed to match curvatures of discs. The elastic portion may include a slot. The guide portion may include a guide slot along which the holding apparatus is guided, and a plurality of locking steps may be formed at a side surface of the guide slot.

According to another aspect of the present invention, there is provided a disc holding apparatus of a disc tray, including: a main body having an elastic portion at one end thereof; an escape prevention portion coupled to another end of the main body and on an upper surface thereof; an escape prevention protrusion coupled to the escape prevention portion; and a locking portion formed on a lower surface of the main body.

According to another aspect of the present invention, there is provided a disc tray which selectively accommodates a plurality of discs in respective accommodation portions, including: a guide portion having a guide slot, first and second locking steps along at least one side of the guide slot, and an insertion groove; and at least one disc holder having a main body with an elastic portion at a first end thereof and slidable in the guide slot, a disc escape prevention section at a second end of the main body, a locking protrusion at the first end of the main body which is engagable by the first and second locking steps when the disc holder is slid in the guide slot, and a locking portion formed on a lower surface of the main body and insertable in the insertion groove.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENT

Figure 1:
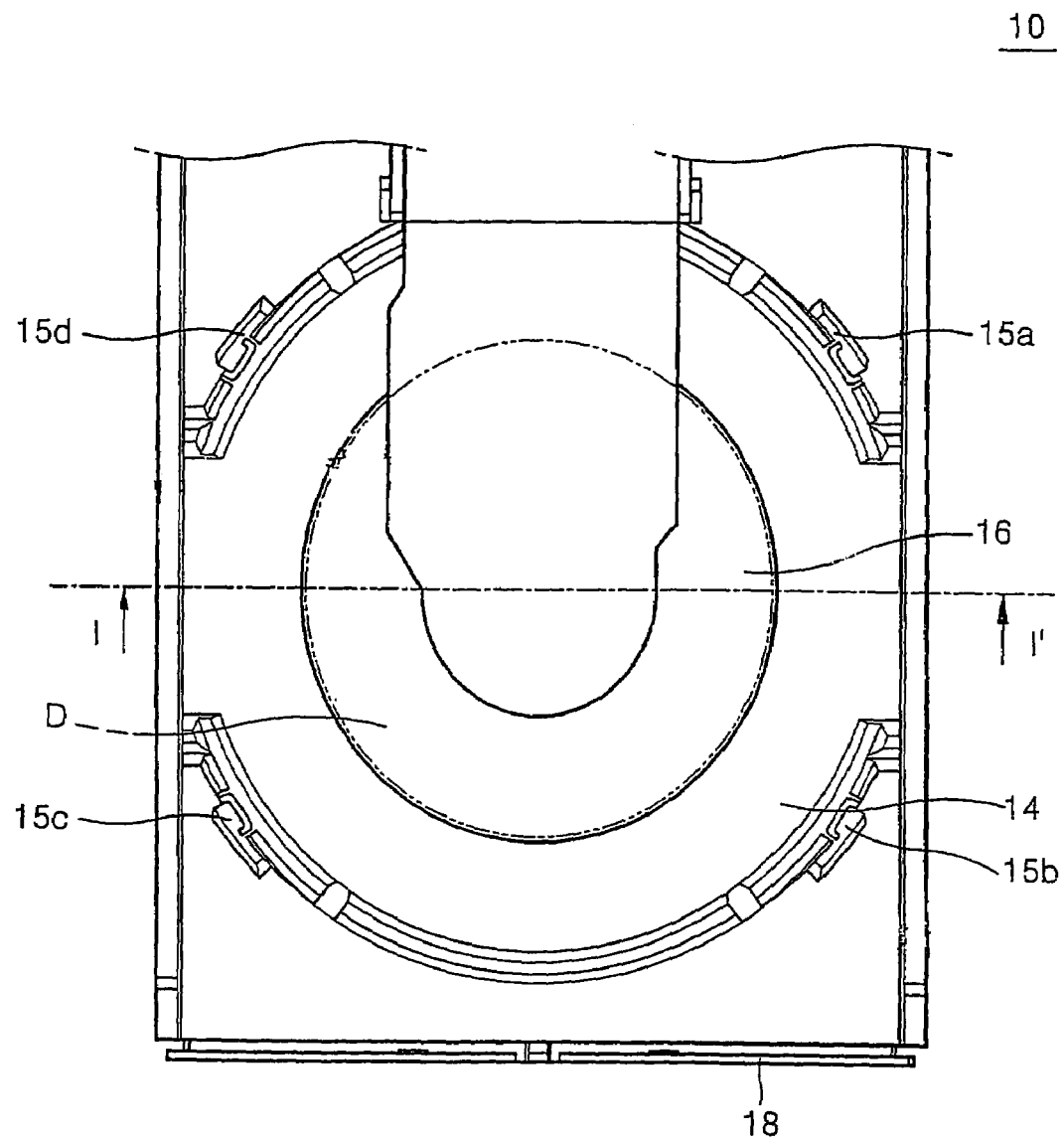
FIG. 1 is a plan view of a conventional disc tray in which a 120 mm disc and a 80 mm disc can be selectively accommodated.
Figure 2:
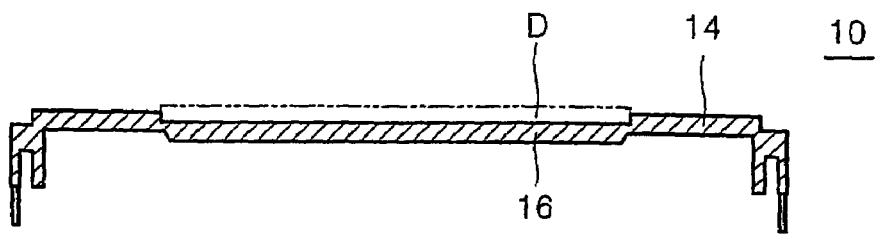
FIG. 2 is a sectional view taken along line I-I' in the conventional disc tray of FIG. 1.

Reference will now be made in detail to an embodiment of the present invention, examples of which are illustrated in the accompanying drawings, wherein like reference numerals refer to the like elements throughout. The embodiment is described below in order to explain the present invention by referring to the figures.

Figure 3:
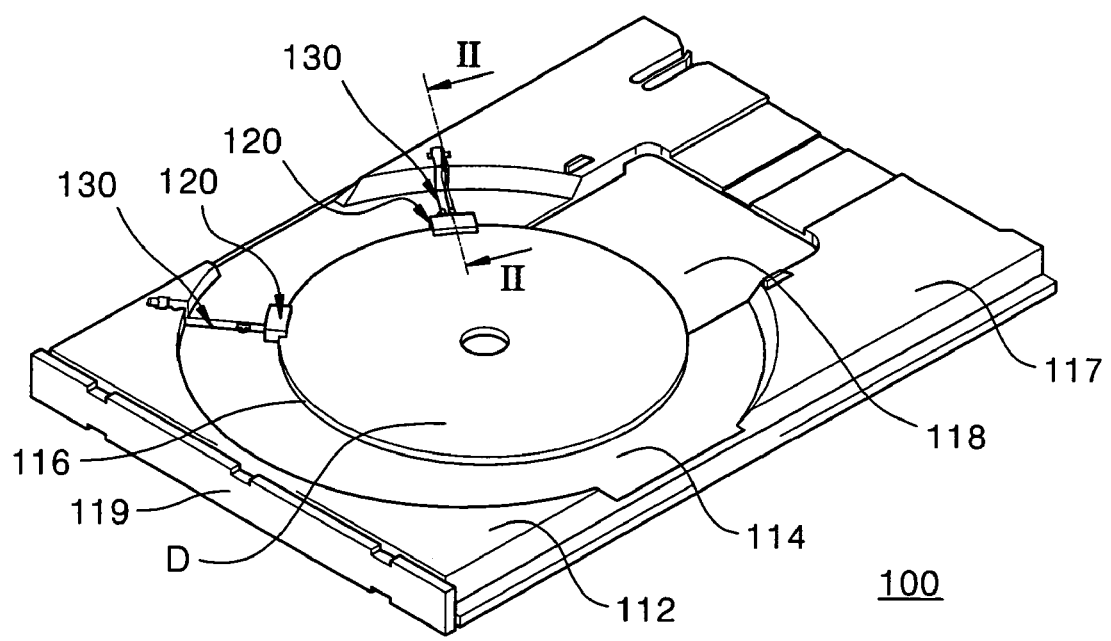
FIG. 3 is a perspective view illustrating a disc tray having a disc holding apparatus according to an embodiment of the present invention.

Referring to FIG. 3, a disc tray 100 according to an embodiment of the present invention includes an open portion 118, guide portions 130, a tray frame 112 having first and second disc accommodation portions 114 and 116, and disc holding apparatuses 120.

In the present embodiment, the first and second disc accommodation portions 114 and 116 have different diameters to accommodate a disc D having different diameters. For example, a disc having a relatively larger diameter is placed on the first disc accommodation portion 114 while a disc having a relatively smaller diameter is placed on the second disc accommodation portion 116. Typically, the disc placed on the first disc accommodation portion 114 has a diameter of 120 mm while the disc placed on the second disc accommodation portion 116 has a diameter of 80 mm.

The open portion 118 is formed on the tray frame 112 of the disc tray 100 in a radial direction so that an optical pickup (not shown) can move to access the disc D after the disc D is loaded on the first disc accommodation portion 114 or second disc accommodation portion 116.

An external rib 119 having a specified thickness is formed at a leading end of the disc tray 110 and a step portion 117 is formed at a trailing end thereof. The external rib 119 is separated a specified distance from the first disc accommodation portion 114 at the opposite side to the step portion 117.

In the present embodiment, the disc tray 110 moves with the disc D in place after the disc D is accommodated on a disc accommodation portion of the disc tray 100. When the loading of the disc D is completed, the disc D is placed on a turntable (not shown). Here, the disc D is separated a specified distance upward from the surface of the disc accommodation portion.

In this state, the disc D is rotated by a spindle motor (not shown) and the optical pickup radiates a light beam onto a surface of the disc D to record or reproduce signals on or from the disc D.

Figure 4:
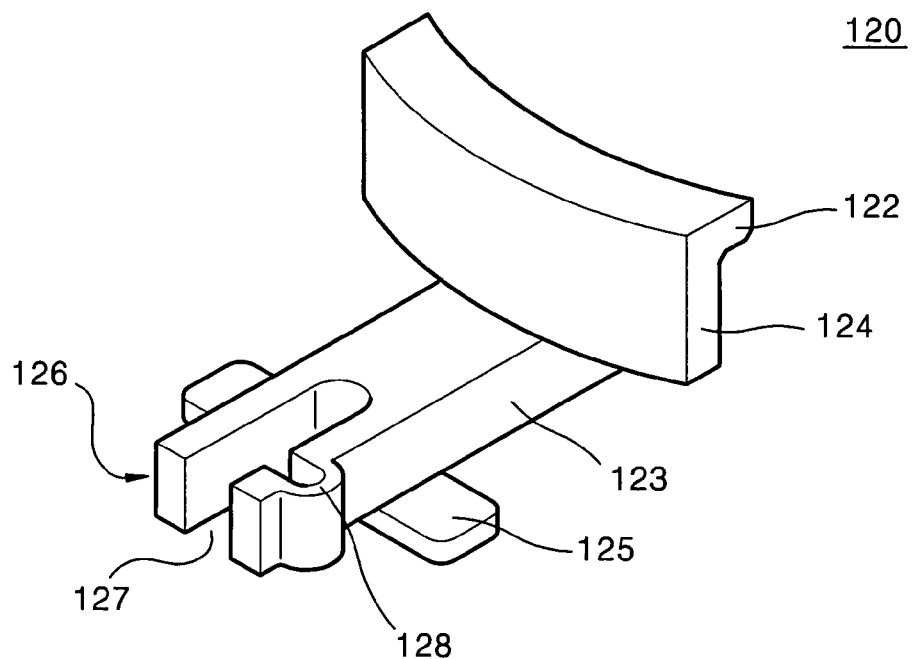
FIG. 4 is a perspective view illustrating the disc holding apparatus of FIG. 3.

FIG. 4 is a perspective view illustrating one of the disc holding apparatuses of FIG. 3. Referring to FIG. 4, the disc holding apparatus 120 according to the present embodiment includes a holding apparatus main body 123 having an elastic portion 126 at one end thereof, a disc escape prevention portion 124 formed at the other end of the holding apparatus main body 123, a disc escape prevention protrusion 122 coupled to an upper portion the disc escape prevention portion 124, and a locking portion 125 formed on a lower surface of the holding apparatus main body 123 at the opposite side of the disc escape prevention portion 124.

Figure 5:
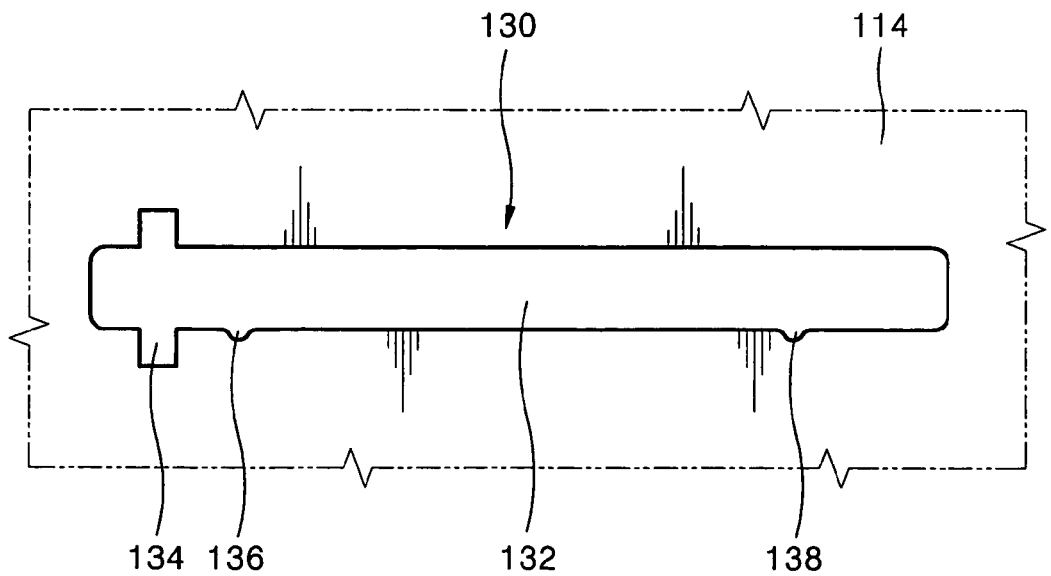
FIG. 5 is a plan view illustrating a guide portion for guiding the disc holding apparatus of FIG. 3.

FIG. 5 is a plan view illustrating a guide portion for guiding the disc holding apparatus of FIG. 3. Referring to FIG. 5, the guide portion 130 according to the present embodiment is formed on the first disc accommodation portion 114 of the tray frame 112 and includes a guide slot 132 guiding the disc holding apparatus 120, a first locking step 136 formed at a first specified position of the guide slot 132, a second locking step 138 formed at a second specified position, and an insertion groove 134 in which the disc holding apparatus 120 is inserted so as to be coupled to the guide slot 132.

Referring to FIGS. 4 and 5, a locking protrusion 128 is formed at the elastic portion 126 provided at the holding apparatus main body 123. Thus, as the locking protrusion 128 is caught by the first locking step 136 formed at the first specified position, the disc holding apparatus 120 can be fixed. For example, in the case that the first disc accommodation portion 114 is designed to accommodate a 120 mm disc and the second disc accommodation portion 116 is designed to accommodate a 80 mm disc, when the locking protrusion 128 of the elastic portion 126 is fixed in the first locking step 136, the disc escape prevention portion 124 is positioned 120 mm apart from the center of the first disc accommodation portion 114.

Also, as the locking protrusion 128 is caught by the second locking step 138 formed at the second specified position, the disc holding apparatus 120 can be fixed. For example, in the case that the first disc accommodation portion 114 is designed to accommodate a 120 mm disc and the second disc accommodation portion 116 is designed to accommodate a 80 mm disc, when the locking protrusion 128 of the elastic portion 126 is fixed in the second locking step 138, the disc escape prevention portion 124 is positioned 80 mm apart from the center of the second disc accommodation portion 116.

Although in the present embodiment the guide slot 132 is linear in form, considering the arrangement of other parts coupled to the disc tray 100 and the disc drive, the guide slot 132 can be formed in a curved form in the tray frame 112 so that the disc D accommodated in the disc accommodation portion can be efficiently fixed.

Also, although in the present embodiment, a pair of the disc holding apparatuses 120 are formed at the left side in FIG. 3 with a specified distance, if the disc placed on the disc accommodation portion can be fixed, the disc holding apparatuses 120 can be coupled to the tray frame 112 regardless of the number and distance thereof.

Also, although in the present embodiment, the disc escape prevention protrusion 122 and the disc escape prevention portion 124 are coupled in an "L" shape and have a shape matching a curvature of the disc, it is possible to modify the shape so that the disc can be easily inserted in or separated from the disc escape prevention protrusion 122. By way of a non-limiting example, the disc escape prevention protrusion 122 can be modified into a "U" shape when viewed from above.

Figure 6A:
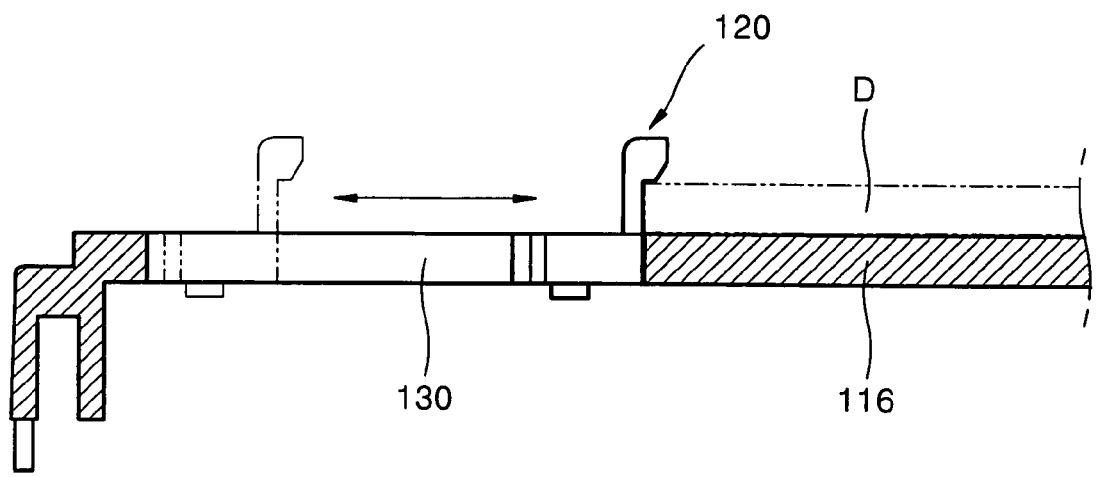
FIG. 6A is a sectional view taken along line II-II' of FIG. 3 to show a state in which the disc holding apparatus of FIG. 3 is coupled to the disc tray when a 80 mm disc is placed on the disc tray.
Figure 6B:
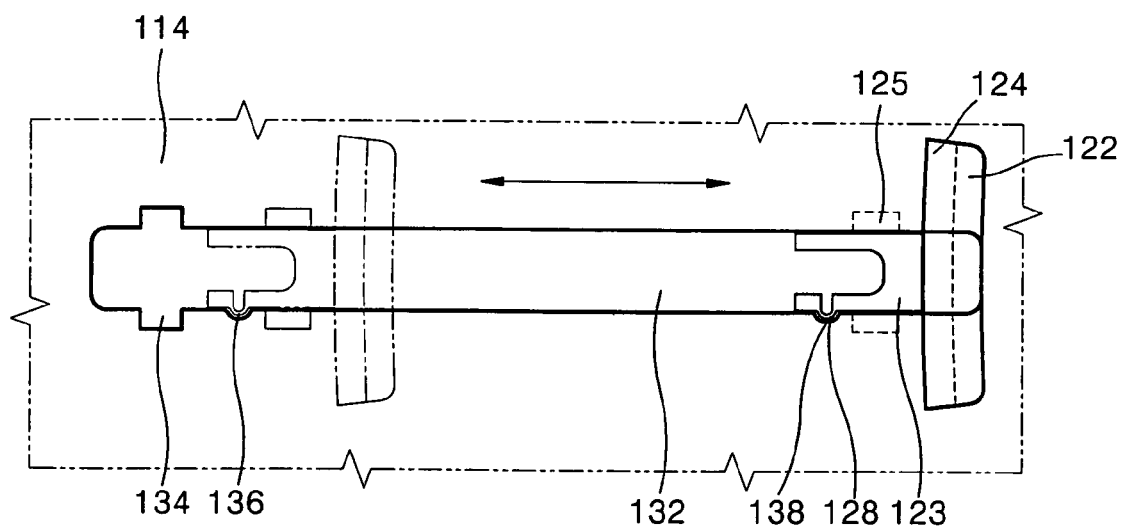
FIG. 6B is a plan view showing a state in which the disc holding apparatus of FIG. 3 is coupled to the disc tray when a 80 mm disc is placed on the disc tray.

FIGS. 6A and 6B are a sectional view and a plan view, respectively, showing a state in which the disc holding apparatus according to the present embodiment operates when a 120 mm disc or a 80 mm disc is selectively placed on the disc tray.

As shown in FIGS. 4, 6A, and 6B, when a 80 mm disc is placed on the second disc accommodation portion 116, the locking portion 125 of the disc holding apparatus 120 is inserted in the insertion groove 134. Then, the disc holding apparatus 120 is moved along the guide slot 132 until the locking protrusion 128 formed at the elastic portion 126 of the disc holding apparatus 120 is coupled to the second locking step 138 formed at the side surface of the guide slot 132.

According to the present embodiment, the locking protrusion 128 formed at the elastic portion 126 of the disc holding apparatus 120 is coupled to the second locking step 138 formed at the side surface of the guide groove 132 of the guide portion 130 so that the side surface of the holding apparatus main body 123 contacts the side surface of the second disc accommodation portion 116 that is a side surface of the guide groove 132. The disc escape prevention portion 124 contacts the side surface of the 80 mm disc D and the disc escape prevention protrusion 122 contacts an edge portion of the 80 mm disc D placed on the second disc accommodation portion 116 so that escape of the 80 mm disc D can be prevented.

According to the present embodiment, the locking portion 125 formed in a lower portion of the holding apparatus main body 123 of the disc holding apparatus 120 prevents escape of the disc holding apparatus 120 from the guide groove 132 while the disc holding apparatus 120 moves along the guide slot 132.

Also, according to the present embodiment, since the elastic portion 126 formed at the holding apparatus main body 123 is formed of an elastic material, when the locking protrusion 128 is located at the first or second locking step 136 or 138, the holding apparatus main body 123 is coupled the first or second locking step 136 or 138 by an elastic force.

Also, according to the present embodiment, a slot 127 having a specified shape is formed in the locking protrusion 128 so that the locking protrusion 128 can easily escape from the first and second locking steps 136 and 138.

In order to remove the 80 mm disc D from the second disc accommodation portion 116 and place a 120 mm disc on the first disc accommodation portion 114, a specified force is applied to the disc holding apparatus 120 so that the locking protrusion 128 coupled to the second locking step 138 escape therefrom. Then, the disc holding apparatus 120 is moved a specified distance toward the insertion groove 134 along the guide slot 132.

Next, the 80 mm disc D placed on the second disc accommodation portion 116 is removed. Then, the disc holding apparatus 120 is moved along the guide groove 132 until the locking protrusion 128 formed at the elastic portion 126 of the disc holding apparatus 120 is coupled to the first locking step 136 formed at the side surface of the guide slot 132. The disc holding apparatus 120 at this time is indicated by a two-dotted line in FIGS. 6A and 6B.

According to the present embodiment, after the disc holding apparatus 120 is located at the first locking step 136, a 120 mm disc is placed on the first disc accommodation portion 114. Thus, the 120 mm disc can be accommodated in the first disc accommodation portion 114 without escaping therefrom.

Although in the above embodiment a disc tray having a pair of disc accommodation surfaces where two discs having different diameters are accommodated is described, a disc tray having a plurality of disc accommodation surfaces where two or more discs can be accommodated can be employed.

Also, in the present embodiment, when the disc drive is vertically installed, a pair of the disc holding apparatuses can be formed in a portion of the disc tray facing the ground.

Further, although in the present embodiment a pair of the disc holding apparatuses are formed on the disc tray, the disc holding apparatus can be formed at the four positions where the conventional guide ribs are installed, so that a disc can be held more firmly.

As described above, according to the disc tray having the disc holding apparatus according to the disclosed embodiment of the present invention, a desktop personal computer, by way of a non-limiting example, can be made thin and small so that, when an optical disc drive is vertically installed, the conventional disc tray can be used by slightly modifying the same.

Thus, by using the disc holding apparatus according to the disclosed embodiment of the present invention, costs can be reduced and a disc is prevented from escaping when the disc drive is installed vertically.

Although an embodiment of the present invention have been shown and described, the present invention is not limited to the described embodiment. Instead, it would be appreciated by those skilled in the art that changes may be made in the embodiment without departing from the principles and spirit of the invention, the scope of which is defined by the claims and their equivalents.

What is claimed is:

1. A disc tray comprising:
a tray frame having a plurality of accommodation portions each of which selectively accommodates one of a plurality of discs having different diameters and at least one guide portion; and
at least one holding apparatus coupled to the guide portion and which holds a selectively accommodated disc,
wherein the holding apparatus includes:
a main body having a longitudinal axis and an elastic portion at one end thereof and extending along the longitudinal axis;
an escape prevention portion coupled to another end of the main body and on an upper surface thereof and having a first shape matching a curvature of one or more of the discs;
an escape prevention protrusion coupled to the escape prevention portion and having a second shape matching the curvature of one or more of the discs; and
a locking portion formed on a lower surface of the main body.

2. The disc tray of claim 1, wherein the elastic portion is a slot.

3. The disc tray of claim 1, wherein the guide portion includes:
a guide slot along which the holding apparatus is guided; and
a plurality of locking steps formed at a side surface of the guide slot.

4. The disc tray of claim 3, wherein the guide portion includes an insertion groove at a side of the guide slot.

5. The disc tray of claim 4, wherein the disc holding apparatus is insertable into the insertion groove so as to be coupled to the guide slot.

6. The disc tray of claim 3, wherein the guide slot has a linear shape.

7. The disc tray of claim 3, wherein the locking steps are formed at a portion where the holding apparatus can hold a disc when the disc is accommodated in one of the accommodation portions.

8. The disc tray of claim 1, wherein the plurality of accommodation portions selectively accommodate at least one of a disc having a diameter of 120 mm and a disc having a diameter of 80 mm.

9. The disc tray of claim 1, wherein the disc escape prevention protrusion and the disc escape prevention portion are coupled in an "L" arrangement.

10. The disc tray of claim 1, wherein the at least one holding apparatus includes a locking protrusion formed at the elastic portion.

11. The disc tray of claim 10, wherein the guide portion includes:
a guide slot along which the holding apparatus is guided; and
a plurality of locking steps formed at a side surface of the guide slot, and
wherein the locking protrusion is accomodatable by any of the plurality of locking steps to fix the disc holding apparatus.

12. The disc tray of claim 11, wherein one of the plurality of locking steps fixes the disc holding apparatus in a position to hold a disc having a diameter of 120 mm in one of the plurality of accommodating portions.

13. The disc tray of claim 11, wherein one of the plurality of locking steps fixes the disc holding apparatus in a position to hold a disc having a diameter of 80 mm in one of the plurality of accommodating portions.

14. The disc tray of claim 1, wherein the plurality of accommodation portions is two and the two accommodation portions have different diameters so as to accommodate discs of different diameters.

15. The disc tray of claim 14, wherein one of the accommodation portions accommodates a disc of 120 mm and the other of the accommodation portions accommodates a disc of 80 mm.

16. A disc tray which selectively accommodates a plurality of discs in respective accommodation portions, comprising:
a guide portion having a guide slot, first and second locking steps along at least one side of the guide slot, and an insertion groove; and
at least one disc holder having a main body with a longitudinal axis and an elastic portion at a first end thereof, and extending along the longitudinal axis, and slidable in the guide slot, a disc escape prevention section at a second end of the main body on an upper surface thereof and extending from the main body in a direction away from the longitudinal axis, a locking protrusion at the first end of the main body which is engagable by the first and second locking steps when the disc holder is slid in the guide slot, and a locking portion formed on a lower surface of the main body and insertable in the insertion groove.

17. The disc tray of claim 16, wherein the disc escape prevention section includes an escape prevention portion coupled to another end of the main body and on an upper surface thereof, an escape prevention protrusion coupled to the escape prevention portion.

18. The disc tray of claim 16, wherein the disc tray is vertically oriented and the at least one disc holder is disposed at a side of the disc tray closest to the ground.

19. The disc tray of claim 18, wherein the at least one disc holder is two disc holders.

20. The disc tray of claim 16, wherein the locking portion prevents escape of the at least one disc holder from the guide slot while the disc holder moves along the guide slot.

21. The disc tray of claim 16, wherein, when the locking protrusion is engaged by either the first locking step or the second locking step, the at least one disc holder is coupled to the respective first locking step or second locking step by an elastic force.

22. The disc tray of claim 16, wherein the locking protrusion has a slot having a specified shape so that the locking protrusion can easily escape from the first and second locking steps.

* * * * *